No. 834,852. PATENTED OCT. 30, 1906.
J. SMITH & E. S. STIMPSON.
AUTOMATIC FILLING REPLENISHING MECHANISM FOR LOOMS.
APPLICATION FILED FEB. 26, 1906.
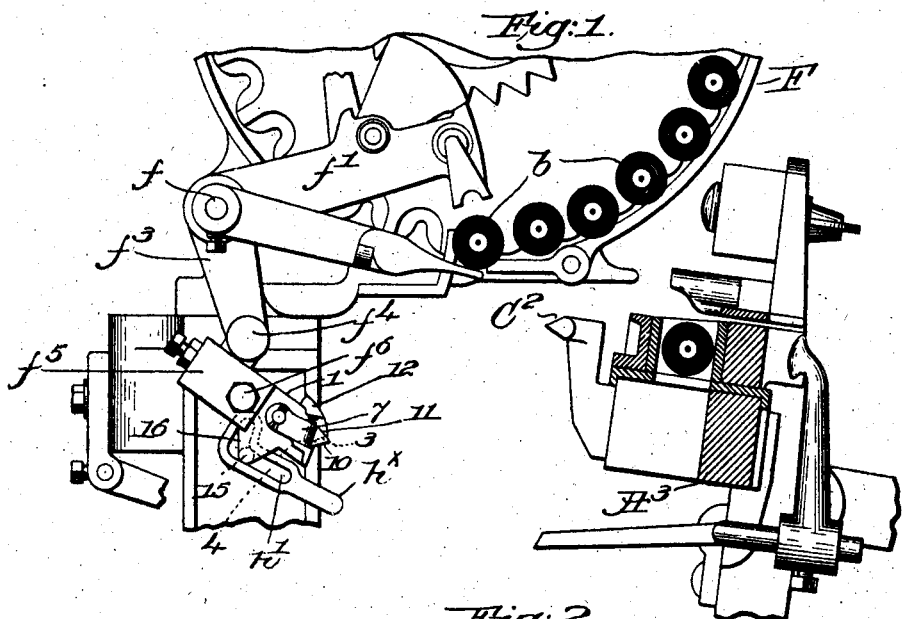
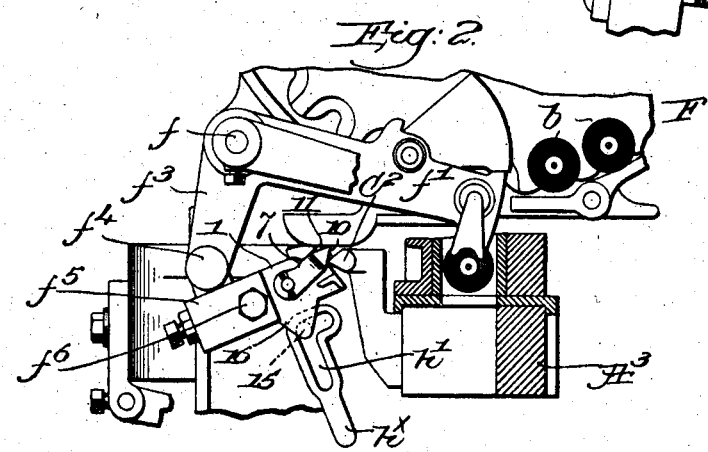
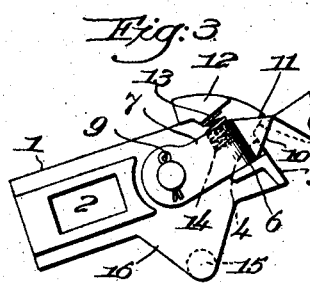
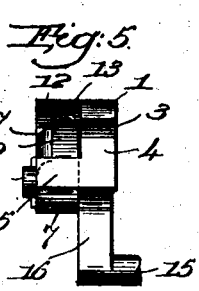
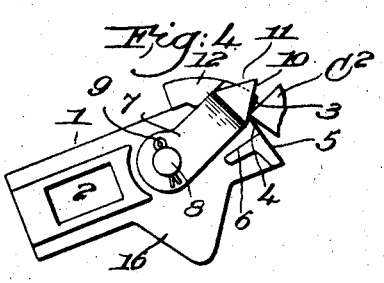

UNITED STATES PATENT OFFICE.

JOHN SMITH AND EDWARD S. STIMPSON, OF HOPEDALE, MASSACHUSETTS, ASSIGNORS TO DRAPER COMPANY, OF HOPEDALE, MASSACHUSETTS, A CORPORATION OF MAINE.

AUTOMATIC FILLING-REPLENISHING MECHANISM FOR LOOMS.

No. 834,852.  Specification of Letters Patent.  Patented Oct. 30, 1906.

Application filed February 26, 1906. Serial No. 303,139.

*To all whom it may concern:*

Be it known that we, JOHN SMITH and EDWARD S. STIMPSON, citizens of the United States, and residents of Hopedale, county of Worcester, and State of Massachusetts, have invented an Improvement in Automatic Filling-Replenishing Mechanism for Looms, of which the following description, in connection with the accompanying drawings, is a specification, like letters on the drawings representing like parts.

This invention relates to mechanism for automatically replenishing the running filling in a loom, and more especially to such mechanism of the Northrop type, an example of which is shown in United States Patent No. 529,940.

In mechanism of this type the supply of filling-carriers or bobbins is held in reserve in a feeder or hopper from which they are removed singly and inserted in the running shuttle by a transferrer mounted to rock on a fixed pivot and having a notched dog connected by a depending arm. When the loom is running properly, the dog is held out of the path of a bunter mounted on a moving part of the loom, usually the lay; but when filling replenishment is necessary the dog is moved into the bunter-path, so that the bunter engages the notch and pushes the dog forward, thereby rocking the transferrer and causing a fresh filling-carrier to be inserted in the shuttle. Sometimes, from looseness or wear or for other reasons, the dog fails to rise as high as it should, so that the edge of the bunter comes in contact with the upper edge of the notched dog, and if such edges remain in contact the dog is pushed forward farther than it should be. As a result the bobbin or filling-carrier being transferred is pushed farther into the shuttle, and this may result in pushing the bobbin entirely through, and hence emptying the shuttle, or if the bobbin is held in the shuttle it may be in such an insecure manner as to be at an angle with the shuttle when the latter is thrown, the incorrectly-held bobbin being caught in the slot in the lay or later in the shed. If after such an edge engagement as referred to the dog slips over the bunter edge and rises during transfer, the bunter will find its proper seat and the transfer will be correctly completed. Should the dog slip down, however, during transfer, the bobbin may be started out of the filling feeder or hopper and then left by the transferrer in such position as to be almost certainly caught in the shed, causing a smash.

Our present invention has for its object primarily the production of means for insuring the proper and complete engagement of the bunter and dog, and thereby cause a correct transfer, even if at the initial impact there should be some improper relative positioning or imperfect engagement of said parts, our invention thus serving as a species of safety device to secure the proper operation of the replenishing mechanism when required or to cause the bunter to pass over the dog, preventing transfer altogether.

The various novel features of our invention will be fully described in the subjoined specification and particularly pointed out in the following claims.

Figure 1 represents, in side elevation and transverse section, a sufficient portion of an automatic filling-replenishing mechanism of the type referred to, with one embodiment of our invention applied thereto, the parts being shown in normal position. Fig. 2 is a similar view, but showing some of the parts in full operative position as a transfer of filling is being effected. Fig. 3 is an enlarged side elevation of the dog, viewed from the outer side thereof, showing the bunter edge as just having engaged the safety device on the dog at a height substantially the same as the upper edge of the dog. Fig. 4 is a similar view of the dog, but showing how the safety device operates to effect the proper coöperation of the dog and bunter, the bunter being shown as fairly and squarely seated in the notch of the dog. Fig. 5 is an end elevation of the dog and safety device, viewing Fig. 3 from the right.

The rotatable hopper or feeder F, Figs. 1 and 2, adapted to contain a supply of filling-carriers or bobbins $b$, the transferrer $f'$, fulcrumed on the fixed stud $f$ and adapted to remove the filling-carriers singly and insert them in the running shuttle, the lay $A^3$, on which is usually mounted the bunter $C^2$, having a beveled edge, and the depending extension $f^3$ of the transferrer may be and are all of well-known construction, the transferrer being held in normal position, Fig. 1, by a spring. (Not shown.)

A stud $f^4$ on the extension $f^3$ has pivotally mounted upon it a plate or carrier $f^5$, which in practice has adjustably secured to it a notched dog to be engaged by the bunter when a replenishment of filling is required, a bolt $f^6$ holding the dog in adjusted position. Heretofore said dog has been made as a plate having a slot for the clamping-bolt and a transversely-notched rear face, and sometimes the bunter will engage the upper edge of the notch, giving too great a movement to the parts, pushing the bobbin too far or entirely through the shuttle, as hereinbefore mentioned, with the attendant objections, or the dog may be depressed to a certain extent, starting the bobbin out of the hopper, but failing to properly insert it in the shuttle.

We will now explain the construction and operation of our present invention, designed to prevent such faulty action.

The dog in accordance with our invention comprises a body portion 1, longitudinally slotted at 2, Figs. 3 and 4, to receive the clamping-bolt $f^6$, the rear or acting face of the body being notched to present two divergent sides or walls 3 4.

The body is laterally extended on its outer side at 5 to form a prolongation of the wall 4, (see Fig. 5,) the top of such extension forming a rest or support 6 for a safety device or latch 7, which at its front end is pivotally mounted on a stud 8, laterally extended from the body 1 of the dog.

A cotter-pin 9 or other suitable retaining device, Figs. 3 and 4, holds the latch on the stud, the upper side 6 of the extension 5 being so placed that normally the beveled rear end 10 11 of the latch projects beyond the notch-wall 4, the edge of the latch extending beyond the notch-wall 3, while the face 10 of the latch is below the said notch-wall 3.

A lateral ear 12 on the body of the dog projects above the latch, and a coiled spring 13 is interposed between said parts, the latch being socketed at 14 (see dotted lines, Fig. 4) to receive one end of the spring, which latter acts to maintain the latch in normal position.

In actual practice a spring (not shown) coiled around the stud $f^4$ tends to swing the dog from its normal inoperative position, Fig. 1, upward to bring its notched face into the path of the bunter $C^2$, such tendency of the spring being resisted by an arm $h^\times$, which is usually connected with the usual shuttle-feeler, (not shown,) and said arm has a cam-slot $h'$, Figs. 1 and 2, in which enters a stud 15, extended from the inner side of a depending part 16 on the dog. When filling replenishment is called for, the shuttle-feeler swings rearward, and thereby the arm $h^\times$ swings rearward and permits the dog to move into operative position, such operation and the construction just described being old and well known in the art. Now when the bunter engages the operatively-positioned dog, supposing the parts to be in proper coöperative relation, the bunter engages the face 10 of the latch 7 and presses the latter forward and upward on its pivot 8 until its face 10 is alined with the notch-wall 3, as in Fig. 2, and the operation of the replenishing mechanism is effected properly. If, however, the dog should not have quite reached its proper operative position, or if the bunter should be worn, it will engage the face 10 of the latch overhanging the notch, and as said latch gives, due to compression of its spring, the change in the position of the latch will cause the edge of the bunter to be directed into proper position in the notch 3 4. If the edge of the bunter should engage the edge of the beveled end of the latch, as in Fig. 3, it will begin to push it forward; but as the latch is pivoted at 8 forward of and slightly below the point of engagement of the bunter and latch the latter will rise, depressing its spring 13, so that the face 10 slips over or across the edge of the bunter, causing the latter to slide down properly into the notch 3 4 of the dog, as in Fig. 4. If the edge of the bunter strikes the face 11 above the edge of the latch, the dog will be depressed sufficiently to prevent any transfer at all.

Any tendency of the bunter to increase the movement of the dog is absolutely prevented by the latch, as described, so that the latch serves as a safety device to insure the proper coöperation of the dog and bunter, if the latter at all engages the latch; and the consequent complete and proper operation of the replenishing mechanism.

From the foregoing description and the drawings it will be manifest that the bunter must always engage the latch before it engages the notched face of the dog, so that the safety device is always operative.

The ear 12 acts not only as a backing for the spring 13, but it also serves as a stop to limit the movement of the latch relatively to the dog when engaged by the bunter.

Various changes or modifications may be made in the details of construction without departing from the spirit and scope of our invention.

Having fully described our invention, what we claim as new, and desire to secure by Letters Patent, is—

1. In filling-replenishing mechanism for looms, a transferrer, a dog connected therewith and having a notched face, a bunter adapted to coöperate with said notched face when the dog is positioned for coöperation with the bunter, and a safety device on the dog to insure proper coöperation between it and the bunter.

2. The combination, in a loom, of means adapted to insert filling-carriers one by one in the running shuttle, a dog, a bunter adapted to coöperate with said dog when operatively positioned and effect the operation of said means, and means movably mounted on the dog to insure proper coöperation thereof with the bunter to thereby effect correct transfer.

3. The combination, in a loom, of means adapted to insert filling-carriers one by one in the running shuttle, a notched dog operatively connected with said means and normally inoperative, a bunter to coöperate with said dog when operatively positioned and effect the actuation of said means, and a yieldingly-mounted latch on the dog overhanging the notch thereof, to be initially engaged by the bunter and insure proper coöperation of the dog and bunter.

4. In filling-replenishing mechanism for looms, a transferrer, a dog connected therewith and having a transversely-notched face, a bunter adapted to enter the notch when the dog is operatively positioned and effect the proper actuation of the transferrer, a spring-controlled latch movably mounted on the dog normally projecting into the notch, and a stop to limit movement of the latch when engaged by the bunter and thereby moved from normal position, said latch serving to insure complete and proper coöperative engagement between the bunter and the notched face of the dog.

5. In filling-replenishing mechanism for looms, a transferrer, a dog connected therewith and having a transversely-notched acting face, a stud laterally extended from the dog forward of its notch, a lateral prolongation of the lower wall of the notch, a latch pivotally mounted on the stud and supported on said prolongation, the acting end of the latch having a beveled face normally overhanging the notch and projecting beyond the upper wall thereof, a spring to normally retain the latch in such position, and a bunter adapted to enter the notch when the dog is operatively positioned, to effect the operation of the transferrer the latch yielding when its beveled face is initially engaged by the bunter and thereby causing the bunter to slide over said face into proper coöperative engagement with the notch in the dog.

6. The combination, in a loom, of filling-replenishing mechanism, a member connected therewith and normally inoperatively positioned, a bunter to coöperate with said member when operatively positioned, to effect the actuation of the replenishing mechanism, and means on said dog to be initially engaged by the bunter when the dog is moved into active position, whereby if there is any engagement between said means and the bunter the latter will insure proper coöperation between the bunter and dog.

7. The combination, in a loom, of filling-replenishing mechanism, a normally inoperative dog connected therewith and having a notched acting face, a bunter to coöperate with said notched dog when operatively positioned, to effect the actuation of the replenishing mechanism, and a safety-latch fulcrumed on the dog forward of its notched face, the free end of the latch extending beyond the notch to initially engage the bunter when the dog is moved into operative position, said latch end having oppositely-beveled faces, engagement of the bunter with the latch at the junction of said faces or on the under face causing the bunter to slide into proper position in the notch of the dog to properly actuate the replenishing mechanism while engagement of the bunter with the upper beveled face depresses the dog sufficiently to prevent any actuation of said mechanism.

8. In filling-replenishing mechanism for looms, a transferrer, a dog connected therewith and having a notched face, a bunter adapted to coöperate with said notched face when the dog is positioned for coöperation with the bunter, and a safety device to insure proper coöperation between the dog and the bunter.

In testimony whereof we have signed our names to this specification in the presence of two subscribing witnesses.

JOHN SMITH.
EDWARD S. STIMPSON.

Witnesses:
GEORGE OTIS DRAPER,
ERNEST W. WOOD.